(12) United States Patent
Oshiumi

(10) Patent No.: US 10,208,815 B2
(45) Date of Patent: Feb. 19, 2019

(54) VEHICLE CONTROL DEVICE

(71) Applicant: Yasuhiro Oshiumi, Gotemba (JP)

(72) Inventor: Yasuhiro Oshiumi, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 594 days.

(21) Appl. No.: 14/787,584

(22) PCT Filed: Apr. 30, 2013

(86) PCT No.: PCT/JP2013/062639
§ 371 (c)(1),
(2) Date: Oct. 28, 2015

(87) PCT Pub. No.: WO2014/178118
PCT Pub. Date: Nov. 6, 2014

(65) Prior Publication Data
US 2016/0076606 A1 Mar. 17, 2016

(51) Int. Cl.
*F16D 48/06* (2006.01)
*B60K 6/36* (2007.10)
*B60W 10/02* (2006.01)
*B60W 20/00* (2016.01)
*B60K 6/387* (2007.10)
*B60K 6/445* (2007.10)

(52) U.S. Cl.
CPC .............. *F16D 48/06* (2013.01); *B60K 6/36* (2013.01); *B60K 6/387* (2013.01); *B60K 6/445* (2013.01); *B60W 10/02* (2013.01); *B60W 20/00* (2013.01); *B60Y 2300/427* (2013.01); *F16D 2500/10406* (2013.01); *F16D 2500/3026* (2013.01); *F16D 2500/3065* (2013.01); *F16D 2500/30401* (2013.01); *F16D 2500/50236* (2013.01); *F16D 2500/50287* (2013.01); *F16D 2500/7041* (2013.01); *Y02T 10/6239* (2013.01)

(58) Field of Classification Search
CPC ............. F16D 48/0625; F16D 48/3026; F16D 48/30401; F16D 48/50236; F16D 48/50287; F16D 48/7041; B60K 6/36; B60K 6/387; B60K 6/445; B60W 10/02; B60W 20/00; B60Y 2300/427
See application file for complete search history.

(56) References Cited

U.S. PATENT DOCUMENTS

2002/0043419 A1 4/2002 Reik et al.
2010/0004837 A1* 1/2010 Connolly ................ F16D 28/00
701/68

(Continued)

FOREIGN PATENT DOCUMENTS

DE 10140745 A1 5/2002
DE 10148088 A1 5/2002
(Continued)

*Primary Examiner* — Huan Le
(74) *Attorney, Agent, or Firm* — Hunton Andrews Kurth LLP

(57) ABSTRACT

A vehicle control device includes a rotating machine, a clutch transmitting torque to the rotating machine when engaged, and a detection unit detecting a change in cogging torque of the rotating machine, and learns an engagement position of the clutch based on a change in the cogging torque during a change in a clutch stroke of the clutch in a case where the rotating machine is stationary.

7 Claims, 4 Drawing Sheets

(56) References Cited

U.S. PATENT DOCUMENTS

| | | | |
|---|---|---|---|
| 2013/0066530 A1 | 3/2013 | Holzer et al. | |
| 2013/0311025 A1* | 11/2013 | Tagawa | B60W 10/08 701/22 |
| 2013/0325231 A1* | 12/2013 | Park | B60W 20/10 701/22 |
| 2014/0067174 A1* | 3/2014 | Park | F16H 61/061 701/22 |

FOREIGN PATENT DOCUMENTS

| | | |
|---|---|---|
| DE | 10157506 A1 | 9/2002 |
| DE | 102011014236 A1 | 12/2011 |
| DE | 102011016999 A1 | 3/2012 |
| JP | 2009-006781 A | 1/2009 |
| JP | 2010-144596 A | 7/2010 |
| JP | 2011-079453 A | 4/2011 |
| JP | 2012-121495 A | 6/2012 |

\* cited by examiner

VEHICLE CONTROL DEVICE

CROSS-REFERENCE TO RELATED APPLICATION

This is a national phase application based on the PCT International Patent Application No. PCT/JP2013/062639 filed Apr. 30, 2013, the entire contents of which are incorporated herein by reference.

TECHNICAL FIELD

The invention relates to a vehicle control device.

BACKGROUND ART

In the related art, learning regarding a clutch has been known. For example, PTL 1 discloses a technique regarding a vehicle control device including stand-by position setting means for setting a stand-by position of a movable element (piston) of a first clutch CL1 in an EV traveling mode on a release side by a predetermined distance from an engagement initiation position at which a transmission torque capacity TCL1 of the first clutch CL1 connecting and disconnecting an engine and a motor from each other begins to be generated, position control means for controlling the movable element (piston) to be at the stand-by position, and stand-by position correcting means for correcting the stand-by position based on the detection of a change in a variable (such as an engine rotation speed Ne) correlated with the transmission torque capacity TCL1 by moving the movable element (piston) to an engagement side in the EV traveling mode or by moving the movable element (piston) to a release side in an HEV traveling mode.

CITATION LIST

Patent Literature

PTL 1: Japanese Patent Application Publication No. 2009-6781 (JP 2009-6781 A)

SUMMARY OF THE INVENTION

It is desirable that the generation of a loss attributable to the learning can be inhibited during the learning of the clutch. In learning based on a change in rotation, for example, a loss attributable to co-rotation and a change in rotation speed may be generated.

An object of the invention is to provide a vehicle control device that is capable of inhibiting the generation of a loss attributable to the learning of an engagement position of a clutch.

A vehicle control device according to the invention includes a rotating machine, a clutch transmitting torque to the rotating machine when engaged, and a detection unit detecting a change in cogging torque of the rotating machine, and learns an engagement position of the clutch based on a change in the cogging torque during a change in a clutch stroke of the clutch in a case where the rotating machine is stationary.

It is preferable that the vehicle control device described above further includes a rotation angle position detecting device detecting a rotation angle position of the rotating machine and the detection unit detects the change in the cogging torque based on a detection result of the rotation angle position detecting device.

In the vehicle control device described above, it is preferable that the clutch stroke at which the rotation angle position begins to change during an increase in the clutch stroke is learned as the engagement position of the clutch.

In the vehicle control device described above, it is preferable that the clutch stroke at which the rotation angle position begins to remain unchanged during a decrease in the clutch stroke is learned as the engagement position of the clutch.

In the vehicle control device described above, it is preferable that an average stroke of the clutch stroke at which the rotation angle position begins to change during an increase in the clutch stroke and the clutch stroke at which the rotation angle position begins to remain unchanged during a decrease in the clutch stroke is learned as the engagement position of the clutch.

It is preferable that the vehicle control device described above includes an engine, a first rotating machine, a second rotating machine, and a differential mechanism in which the engine, the first rotating machine, and the second rotating machine are connected to different rotating elements, the clutch transmits torque to the first rotating machine when engaged, the detection unit detects a change in cogging torque of the first rotating machine, an engagement position of the clutch is learned based on a change in the cogging torque during a change in a clutch stroke of the clutch in a case where the first rotating machine is stationary, and the learning of the engagement position of the clutch can be executed during traveling during which the second rotating machine serves as a power source or while a vehicle remains stopped with the engine being in operation.

It is preferable that the vehicle control device described above further includes an engine, the clutch connects and disconnects a flow of power between the engine, and the first rotating machine and a drive wheel, and the engagement position of the clutch is learned while a vehicle remains stopped with the engine being in operation.

The vehicle control device according to the invention learns the engagement position of the clutch based on the change in the cogging torque during the change in the clutch stroke of the clutch in a case where the rotating machine is stationary. With the vehicle control device according to the invention, the engagement position can be learned without rotating the rotating machine and the generation of a loss attributable to the learning of the engagement position of the clutch can be inhibited.

MODES FOR CARRYING OUT THE INVENTION

Hereinafter, a vehicle control device according to an embodiment of the invention will be described in detail with reference to accompanying drawings. The invention is not limited to the embodiment. Components that constitute the following embodiment include those that can be easily assumed by those skilled in the art and those substantially identical thereto.

Embodiment

Figure 1:
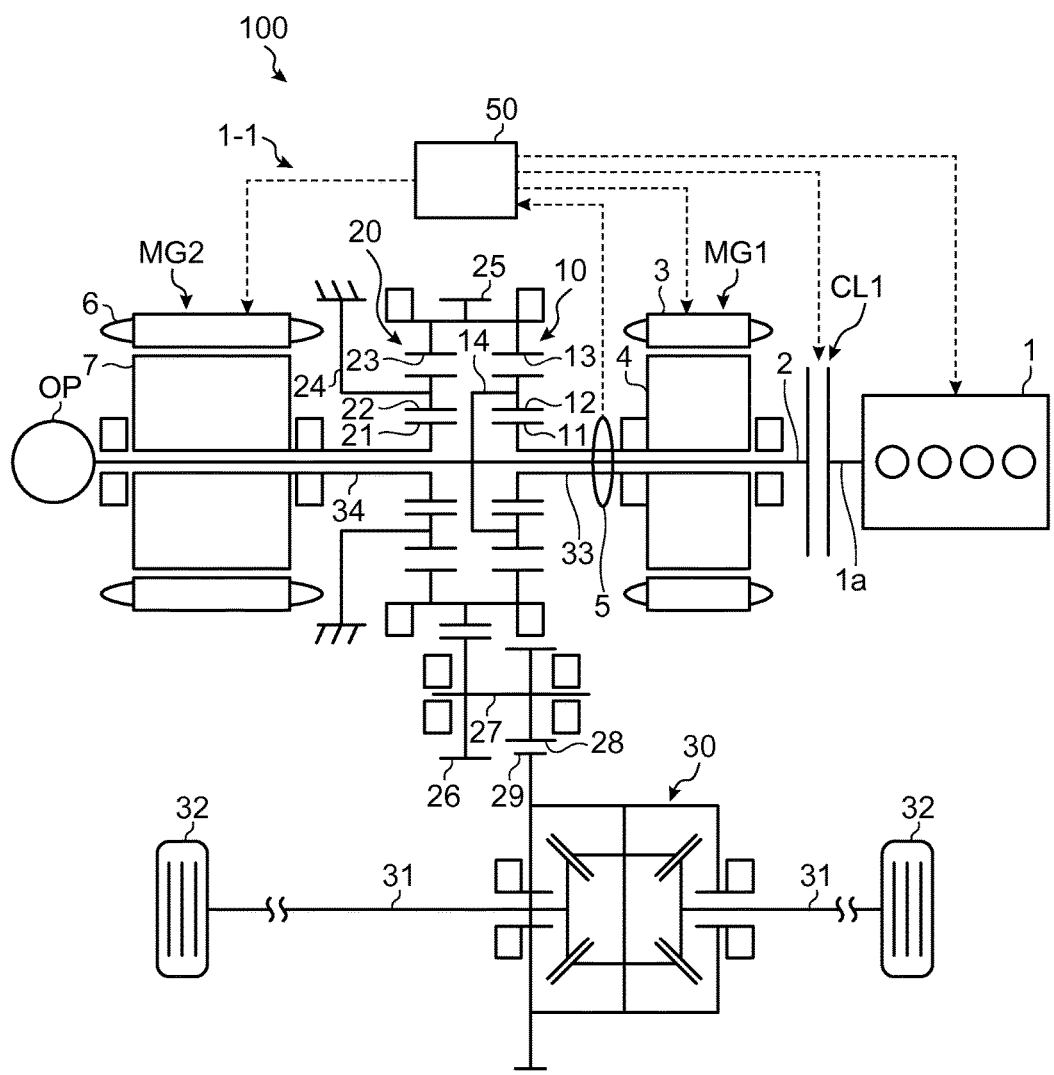
FIG. 1 is a skeleton diagram of a vehicle according to an embodiment.
Figure 2:
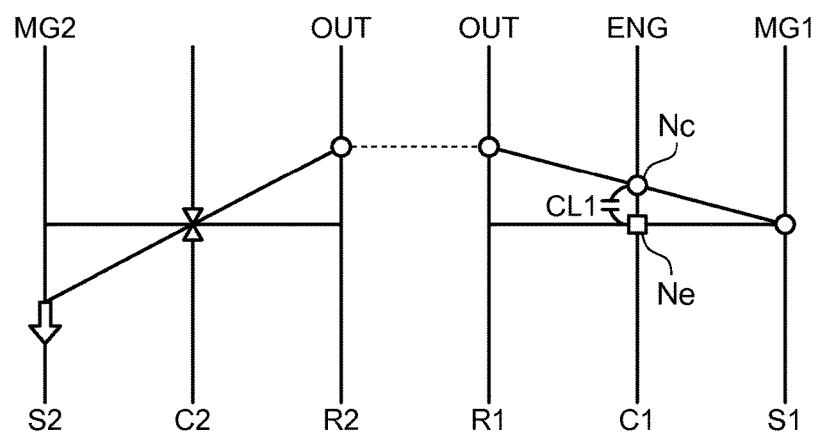
FIG. 2 is a nomogram regarding an EV traveling mode of the embodiment.
Figure 3:
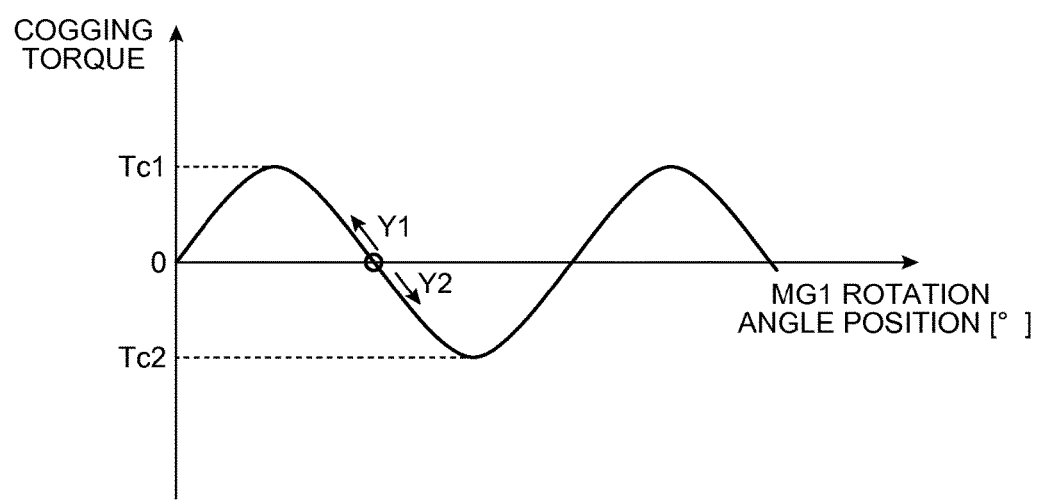
FIG. 3 is a diagram illustrating an example of cogging torque.
Figure 4:
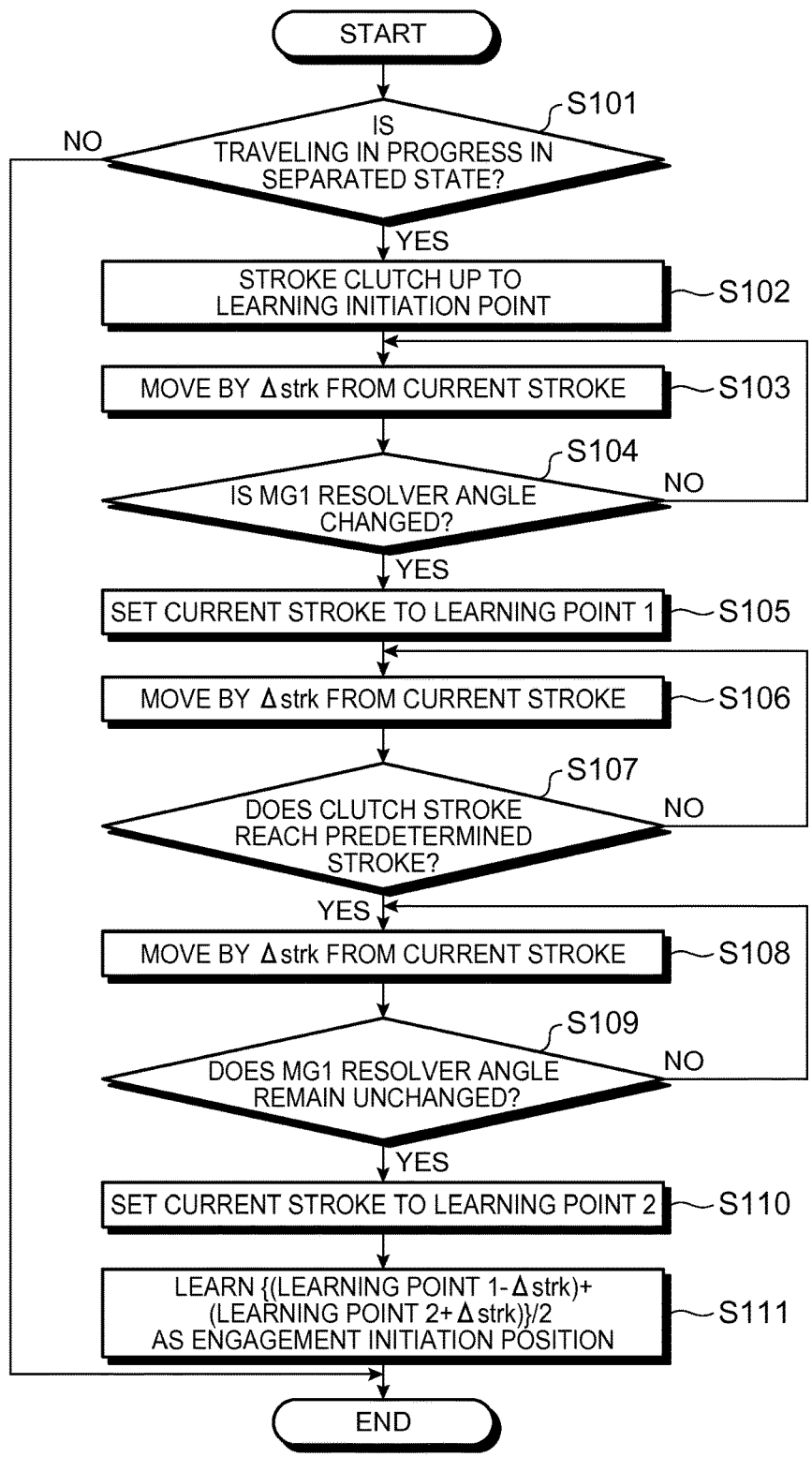
FIG. 4 is a flowchart regarding learning control according to the embodiment.
Figure 5:
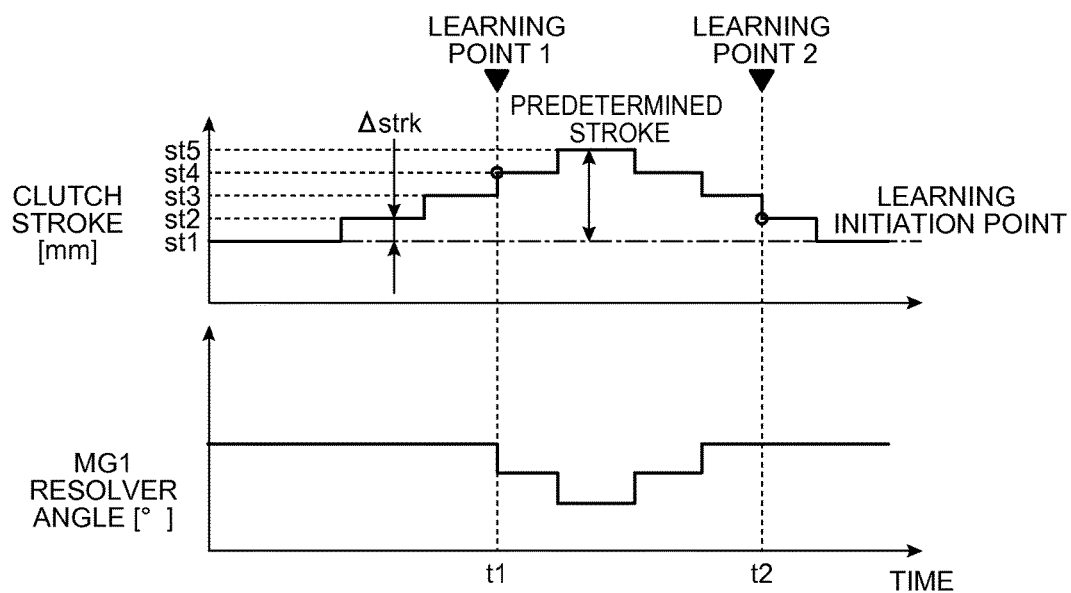
FIG. 5 is a time chart regarding the learning control according to the embodiment.

The embodiment will be described with reference to FIGS. 1 to 5. This embodiment relates to the vehicle control device. FIG. 1 is a skeleton diagram of a vehicle according to the embodiment of the invention. FIG. 2 is a nomogram regarding an EV traveling mode of the embodiment. FIG. 3 is a diagram illustrating an example of cogging torque. FIG. 4 is a flowchart regarding learning control according to the embodiment. FIG. 5 is a time chart regarding the learning control according to the embodiment.

As illustrated in FIG. 1, a vehicle 100 is a hybrid vehicle that has an engine 1, a first rotating machine MG1, and a second rotating machine MG2. The vehicle 100 may be a plug-in hybrid vehicle (PHV) that can be charged by an external electric power supply. A vehicle control device 1-1 according to this embodiment is configured to include the first rotating machine MG1, a clutch CL1, a rotation angle position detecting device 5, and an ECU 50. The vehicle control device 1-1 may be configured to include the engine 1, the second rotating machine MG2, a first planetary gear mechanism 10, and the like as well. A driving device for the vehicle 100 according to this embodiment can be applied to a front-engine, front-wheel-drive (FF) vehicle, a rear-engine, rear-wheel-drive (RR) vehicle, and the like. The driving device is mounted on the vehicle 100 for the axial direction of an input shaft 2 to correspond to, for example, the width direction of the vehicle.

The engine 1, which is an example of engines, converts the combustion energy of a fuel into the rotary motion of an output shaft 1a and outputs the result. The output shaft 1a is connected to the input shaft 2 via the clutch CL1. The clutch CL1 is capable of transmitting torque to the first rotating machine MG1 when engaged. The clutch CL1 is a friction engagement-type clutch device such as a wet multi-plate-type clutch. The clutch CL1 according to this embodiment is configured to be capable of controlling a clutch stroke that is an engagement-direction stroke amount. The clutch CL1 is provided with, for example, a stroke sensor that detects the clutch stroke. The clutch CL1 according to this embodiment controls the clutch stroke when a supplied hydraulic pressure is regulated. The hydraulic pressure supplied to the clutch CL1 is feedback-controlled so that the detected clutch stroke corresponds to a target clutch stroke.

The input shaft 2 is an input shaft of a power transmission unit and is arranged coaxially with the output shaft 1a and on an extension from the output shaft 1a. The input shaft 2 is connected to a first carrier 14 of the first planetary gear mechanism 10 and rotates integrally with the first carrier 14.

The first planetary gear mechanism 10 is an example of a differential mechanism in which the engine 1, the first rotating machine MG1, and the second rotating machine MG2 are connected to different rotating elements. The first planetary gear mechanism 10 is a single pinion-type planetary gear mechanism. The first planetary gear mechanism 10 has a first sun gear 11, a first pinion gear 12, a first ring gear 13, and the first carrier 14.

The first ring gear 13 is arranged coaxially with the first sun gear 11 and radially outside the first sun gear 11. The first pinion gear 12 is arranged between the first sun gear 11 and the first ring gear 13 and meshes with each of the first sun gear 11 and the first ring gear 13. The first pinion gear 12 is rotatably supported by the first carrier 14. The first carrier 14 is connected to the input shaft 2 and rotates integrally with the input shaft 2. Accordingly, the first pinion gear 12 can rotate (revolve) about the central axis of the input shaft 2 with the input shaft 2 and can rotate (spin) about the central axis of the first pinion gear 12 by being supported by the first carrier 14.

The first sun gear 11 is connected to a rotating shaft 33 of the first rotating machine MG1 and rotates integrally with a rotor 4 of the first rotating machine MG1. The first rotating machine MG1 is arranged on the engine 1 side with respect to the first planetary gear mechanism 10.

A second planetary gear mechanism 20 is arranged coaxially with the first planetary gear mechanism 10 and on the side opposite to the engine 1 side. The second planetary gear mechanism 20 is arranged to be adjacent to the first planetary gear mechanism 10 and constitutes a complex planetary with the first planetary gear mechanism 10. The second planetary gear mechanism 20 functions as a deceleration planetary gear mechanism that decelerates the rotation of the second rotating machine MG2 and outputs the result. The second planetary gear mechanism 20 is a single pinion-type planetary gear mechanism. The second planetary gear mechanism 20 has a second sun gear 21, a second pinion gear 22, a second ring gear 23, and a second carrier 24.

The second ring gear 23 is arranged coaxially with the second sun gear 21 and radially outside the second sun gear 21. The second pinion gear 22 is arranged between the second sun gear 21 and the second ring gear 23 and meshes with each of the second sun gear 21 and the second ring gear 23. The second pinion gear 22 is rotatably supported by the second carrier 24. The second carrier 24 is fixed, not to be rotatable, on a vehicle body side. The second pinion gear 22 is supported by the second carrier 24 and can rotate (spin) about the central axis of the second pinion gear 22.

The second sun gear 21 is connected to a rotating shaft 34 of the second rotating machine MG2 and rotates integrally with a rotor 7 of the second rotating machine MG2. The second ring gear 23 is connected to the first ring gear 13 and rotates integrally with the first ring gear 13. A counter drive gear 25 is disposed on outer peripheral surfaces of the first ring gear 13 and the second ring gear 23. The counter drive gear 25 is an output gear that is disposed in output shafts of the first planetary gear mechanism 10 and the second planetary gear mechanism 20. The counter drive gear 25 meshes with a counter driven gear 26. The counter driven gear 26 is connected to a drive pinion gear 28 via a counter shaft 27. The drive pinion gear 28 meshes with a differential ring gear 29 of a differential device 30. The differential device 30 is connected to drive wheels 32 via right and left driving shafts 31.

Each of the first rotating machine MG1 and the second rotating machine MG2 functions as a motor (electric motor) and an electric power generator. The first rotating machine MG1 has a stator 3 that is fixed on the vehicle body side and the rotor 4 that is rotatably supported. The second rotating machine MG2 has a stator 6 that is fixed on the vehicle body side and the rotor 7 that is rotatably supported. The first rotating machine MG1 and the second rotating machine MG2 are connected to a battery via inverters. The first rotating machine MG1 and the second rotating machine MG2 can convert the electric power that is supplied from the battery into mechanical power and output the result and can convert mechanical power into electric power by being driven by input power. The electric power that is generated by the rotating machines MG1, MG2 can be stored in the battery. AC synchronous-type motor generators or the like can be used as the first rotating machine MG1 and the second rotating machine MG2.

The rotation angle position detecting device 5 detects the rotation angle position of the rotor 4 of the first rotating machine MG1 (hereinafter, also referred to as an "MG1 rotation angle position"). The rotation angle position detecting device 5 according to this embodiment is a resolver and can accurately detect the MG1 rotation angle position. An oil pump OP is arranged in the end portion of the input shaft 2 on the side opposite to the engine 1 side. The oil pump OP is driven by the rotation of the input shaft 2 so that a lubricant is supplied to each portion of the vehicle 100.

The ECU 50 is an electronic control unit that has a computer. The ECU 50 is electrically connected to the engine 1, the first rotating machine MG1, and the second rotating machine MG2. The ECU 50 can control each of the engine 1, the first rotating machine MG1, and the second rotating machine MG2. The ECU 50 can execute various types of control such as injection control, ignition control, and intake control regarding the engine 1. In addition, the ECU 50 can control the output torque of the first rotating machine MG1 (hereinafter, referred to as "MG1 torque"). In this embodiment, an input/output current with respect to the first rotating machine MG1 (including an electric power generation amount) is regulated in accordance with a torque command value with respect to the first rotating machine MG1 so that the MG1 torque is controlled. In addition, the ECU 50 can control the output torque of the second rotating machine MG2 (hereinafter, referred to as "MG2 torque"). In this embodiment, an input/output current with respect to the second rotating machine MG2 (including an electric power generation amount) is regulated in accordance with a torque command value with respect to the second rotating machine MG2 so that the MG2 torque is controlled.

The ECU 50 controls the clutch CL1. The ECU 50 outputs a clutch stroke command value to the clutch CL1. A hydraulic pressure control device (not illustrated) of the clutch CL1 regulates the engagement hydraulic pressure of the clutch CL1 with the clutch stroke command value set as the target clutch stroke. The ECU 50 is electrically connected to the rotation angle position detecting device 5 and acquires the rotation angle position of the rotor 4 of the first rotating machine MG1 based on a detection result of the rotation angle position detecting device 5.

The vehicle 100 can selectively execute the EV traveling mode or a HV traveling mode. The EV traveling mode is a traveling mode in which traveling is performed with the second rotating machine MG2 serving as a power source. In the nomogram that is illustrated in FIG. 2, the S1 axis represents the first sun gear 11 and the rotation speed of the first rotating machine MG1 (hereinafter, referred to as an "MG1 rotation speed"), the C1 axis represents the first carrier 14 and the rotation speed of the engine 1, and the R1 axis represents the rotation speed of the first ring gear 13. The quadrangular mark on the C1 axis represents an engine rotation speed Ne and the circular mark on the C1 axis represents a carrier rotation speed Nc that is the rotation speed of the first carrier 14.

In FIG. 2, the S2 axis represents the rotation speed of the second rotating machine MG2 (hereinafter, referred to as an "MG2 rotation speed"), the C2 axis represents the rotation speed of the second carrier 24, and the R2 axis represents the rotation speed of the second ring gear 23. In this embodiment, the first ring gear 13 and the second ring gear 23 are connected to each other, and thus the rotation speeds of both correspond to each other.

As illustrated in FIG. 2, the clutch CL1 is released during the EV traveling. During the EV traveling, the engine 1 is stationary and the carrier rotation speed Nc is the rotation speed in accordance with the speed of the vehicle. The second rotating machine MG2 can generate a forward driving force in the vehicle 100 based on the output of positive torque from the second ring gear 23 by outputting negative torque and causing negative rotation. Herein, positive rotation means the rotation of each of the ring gears 13, 23 during the forward traveling of the vehicle 100. The rotation of the second carrier 24 is restricted, and thus the second carrier 24 functions to receive a reaction force with respect to the MG2 torque and transmits the MG2 torque to the second ring gear 23.

In this embodiment, the rotation of the first rotating machine MG1 is stopped during the EV traveling. The first rotating machine MG1 is maintained in a state where the rotation is stopped by, for example, the cogging torque. The dragging loss or the like of the first rotating machine MG1 is reduced because the first rotating machine MG1 remains stationary.

The HV traveling mode is a traveling mode in which traveling is performed with the engine 1 serving as a power source. In the HV traveling mode, the second rotating machine MG2 may also serve as a power source. In the HV traveling mode, the clutch CL1 is engaged. In the HV traveling mode, the first rotating machine MG1 functions to receive a reaction force with respect to engine torque. The first rotating machine MG1 functions to receive the reaction force with respect to the engine torque by outputting the MG1 torque and outputs the engine torque from the first ring gear 13. The first planetary gear mechanism 10 can function as a power dividing mechanism that distributes the engine torque to the first rotating machine MG1 side and an output side.

It is preferable that an accurate engagement position of the clutch CL1 is grasped during the engagement and release control of the clutch CL1. The engagement position of the clutch CL1 is a clutch stroke at which the clutch CL1 begins to be engaged. The engagement position of the clutch CL1 is a clutch stroke at which engagement elements of the clutch CL1 are engaged with each other and torque begins to be transmitted when the clutch stroke of the clutch CL1 is gradually increased or a clutch stroke at which the engagement between the engagement elements is eliminated and the torque transmission is stopped when the clutch stroke is gradually decreased from a state where the engagement elements are engaged with each other.

The vehicle control device 1-1 according to this embodiment performs the learning control regarding the engagement position of the clutch CL1. With regard to a case where the learning control regarding the engagement position of the clutch CL1 is performed, it is considered that the engagement position is detected based on, for example, a fluctuation of the MG1 rotation speed available when the clutch CL1 is engaged or released during the rotation of the first rotating machine MG1. However, this learning method based on the rotational position fluctuation is subjected to the generation of a loss attributable to the rotation of the first rotating machine MG1 or the like. In addition, the accuracy of the learning may lack uniformity in a case where the learning is based on a change in rotation.

The vehicle control device 1-1 according to this embodiment learns the engagement position of the clutch CL1 based on a change in the cogging torque during a change in the clutch stroke of the clutch CL1 in a case where the first rotating machine MG1 is stationary. Accordingly, the engagement position of the clutch CL1 can be learned without rotating the first rotating machine MG1, and thus the generation of the loss that is attributable to the learning of the engagement position of the clutch CL1 can be inhibited. In addition, the engagement position can be accurately learned whereas the engagement position learning method based on a change in the rotation of the first rotating machine MG1 lacks the accuracy.

In the vehicle control device 1-1 according to this embodiment, the ECU 50 functions as a detection unit that detects the change in the cogging torque of the first rotating machine MG1. The ECU 50 detects the change in the cogging torque based on the detection result of the rotation angle position detecting device 5. Hereinafter, a method for detecting the change in the cogging torque will be described with reference to FIG. 3.

As illustrated in FIG. 3, the cogging torque changes in, for example, a sinusoidal shape in accordance with the MG1 rotation angle position. The rotor 4 is stopped at a stable position (examples of which include a position at which the cogging torque is 0) at which, for example, a positive rotation-direction magnetic force and a negative rotation-direction magnetic force are balanced with each other in a state where the input/output current of the first rotating machine MG1 is absent. In a case where torque is input to the rotor 4 from the outside and the input torque from the outside is torque between a positive extreme value Tc1 and a negative extreme value Tc2 of the cogging torque, the input torque and the cogging torque are balanced with each other and the rotor 4 is stopped at the torque-balanced MG1 rotation angle position.

Accordingly, the change in the cogging torque can be detected based on a change in the MG1 rotation angle position when the first rotating machine MG1 is stationary. In a case where the learning control regarding the engagement position of the clutch CL1 is performed, the ECU 50 allows the clutch CL1 to be engaged from a state where the first rotating machine MG1 is stationary. When the engagement of the clutch CL1 is initiated, torque begins to be transmitted to the rotor 4 of the first rotating machine MG1 or the torque transmitted to the rotor 4 changes. In a case where the input torque with respect to the rotor 4 changes to the negative torque side, for example, the MG1 rotation angle position changes to a cogging torque-increasing side as illustrated by an arrow Y1. In a case where the input torque with respect to the rotor 4 changes to the positive torque side, the MG1 rotation angle position changes to a cogging torque-decreasing side as illustrated by an arrow Y2. In other words, the change in the MG1 rotation angle position shows a change in the cogging torque of the first rotating machine MG1 and shows a change in the input torque with respect to the rotor 4. The ECU 50 detects the engagement position of the clutch based on the change in the cogging torque attributable to this change in the input torque with respect to the rotor 4.

Specifically, the ECU 50 can learn, as the engagement position of the clutch CL1, the clutch stroke at which the MG1 rotation angle position begins to change when the clutch stroke is gradually increased from a state where the clutch CL1 is released. In addition, the ECU 50 does not learn, as the engagement position, the clutch stroke at which the MG1 rotation angle position does not change when the clutch stroke is gradually increased.

In addition, the ECU 50 can learn, as the engagement position of the clutch CL1, the clutch stroke at which the MG1 rotation angle position begins to remain unchanged when the clutch stroke is gradually decreased from a state where the clutch CL1 is engaged and the rotation of the first rotating machine MG1 is stopped by the cogging torque. In addition, the ECU 50 does not learn, as the engagement position, the clutch stroke at which the MG1 rotation angle position changes when the clutch stroke is gradually decreased.

Since the learning method regarding the engagement position of the clutch CL1 according to this embodiment is based on a change in the value that is detected by the rotation angle position detecting device 5, the engagement position can be accurately detected. Hereinafter, engagement position learning control according to this embodiment will be described with reference to FIGS. 4 and 5. The control flow that is illustrated in FIG. 4 is repeatedly executed at predetermined time intervals when, for example, the engagement position of the clutch CL1 needs to be learned.

In Step S101, the ECU 50 determines whether or not traveling is in progress in a separated state. The ECU 50 performs a positive determination in Step S101 when, for example, the traveling is in progress with the clutch CL1 released. In Step S101, it is determined whether or not the learning control regarding the engagement position of the clutch CL1 can be initiated. In a case where the engagement position learning control is executed, the first rotating machine MG1 may be shut down and may be stopped by the cogging torque. The ECU 50 performs the positive determination in Step S101 during, for example, the EV traveling and learns the engagement position of the clutch CL1. The processing proceeds to Step S102 in a case where it is determined as a result of the determination of Step S101 that the traveling in the separated state is in progress (Step S101-Y). Otherwise (Step S101-N), this control flow is terminated.

In Step S102, the ECU 50 strokes the clutch CL1 up to a learning initiation point. The learning initiation point that is illustrated in FIG. 5 is appropriately set to a stroke ahead of an engagement initiation position. When an increase in the clutch stroke is initiated from the learning initiation point, a learning period can be shortened than in a case where the increase in the clutch stroke is initiated from 0. The ECU 50 outputs a clutch stroke st1 at the learning initiation point as the clutch stroke command value with respect to the clutch CL1. The processing proceeds to Step S103 after the execution of Step S102.

In Step S103, the ECU 50 moves the clutch stroke by a stroke change amount $\Delta strk$ from the current stroke. The stroke change amount $\Delta strk$ is a positive clutch stroke. In this embodiment, the stroke change amount $\Delta strk$ is the minimum movement amount of the clutch stroke. The ECU 50 increases the clutch stroke command value by the stroke change amount $\Delta strk$ and moves the engagement element of the clutch CL1 in the engagement direction. The processing proceeds to Step S104 after the execution of Step S103.

In Step S104, the ECU 50 determines whether or not an MG1 resolver angle is changed. The ECU 50 determines whether or not the MG1 rotation angle position detected by the rotation angle position detecting device 5 is changed before and after the clutch stroke command value is changed in Step S103. The processing proceeds to Step S105 in a case where it is determined as a result of the determination of Step S104 that the MG1 resolver angle is changed (Step S104-Y). Otherwise (Step S104-N), the processing proceeds to Step S103 and the clutch stroke is increased.

In Step S105, the ECU 50 sets the current stroke to a learning point 1. In FIG. 5, the MG1 resolver angle begins to change at time t1 and a current stroke st4 available in this case is set to the learning point 1. The processing proceeds to Step S106 after the execution of Step S105.

In Step S106, the ECU 50 moves the clutch stroke by the stroke change amount Δstrk from the current stroke. The ECU 50 increases the clutch stroke command value by the stroke change amount Δstrk and moves the engagement element of the clutch CL1 further in the engagement direction. The processing proceeds to Step S107 after the execution of Step S106.

In Step S107, the ECU 50 determines whether or not the clutch stroke reaches a predetermined stroke. The predetermined stroke, which is determined in advance, is a clutch stroke exceeding the clutch stroke at the engagement position. As illustrated in FIG. 5, a predetermined stroke st5 is a value that exceeds the learning point 1 (clutch stroke st4). In this embodiment, the learning of the engagement position that is performed while the clutch CL1 is engaged is terminated when the clutch stroke reaches the predetermined stroke st5. When the clutch stroke reaches the predetermined stroke st5, the ECU 50 moves the engagement element of the clutch CL1 in a release direction and performs the learning of the engagement position. The processing proceeds to Step S108 in a case where it is determined as a result of the determination of Step S107 that the clutch stroke reaches the predetermined stroke (Step S107-Y). Otherwise (Step S107-N), the processing proceeds to Step S106 and the clutch stroke is increased.

In Step S108, the ECU 50 moves the clutch stroke by the stroke change amount Δstrk in the release direction from the current stroke. The ECU 50 moves the engagement element of the clutch CL1 in the release direction by decreasing the clutch stroke command value by the stroke change amount Δstrk. The processing proceeds to Step S109 after the execution of Step S108.

In Step S109, the ECU 50 determines whether or not the MG1 resolver angle remains unchanged. The ECU 50 determines whether or not the MG1 rotation angle position detected by the rotation angle position detecting device 5 remains unchanged before and after the clutch stroke command value is changed in Step S108. The processing proceeds to Step S110 in a case where it is determined as a result of the determination of Step S109 that the MG1 resolver angle remains unchanged (Step S109-Y). Otherwise (Step S109-N), the processing proceeds to Step S108 and the clutch stroke is decreased.

In Step S110, the ECU 50 sets the current stroke to a learning point 2. In FIG. 5, no change in the MG1 resolver angle is detected from time t2 and a current stroke st2 available in this case is set to the learning point 2. The processing proceeds to Step S111 after the execution of Step S110.

In Step S111, the ECU 50 learns the clutch stroke that is calculated by the following formula (1) as the engagement initiation position.

$$\{(\text{learning point } 1-\Delta strk)+(\text{learning point } 2+\Delta strk)\}/2 \quad (1)$$

(learning point 1−Δstrk) in this formula (1), which is the clutch stroke at which the MG1 rotation angle position begins to change, is a clutch stroke st3 in the case of FIG. 5. (learning point 2+Δstrk) in this formula (1), which is the clutch stroke at which the MG1 rotation angle position begins to remain unchanged, is the clutch stroke st3 in the case of FIG. 5.

In other words, the ECU 50 learns, as the engagement position of the clutch CL1, the average stroke of the clutch stroke (learning point 1−Δstrk) at which the MG1 rotation angle position begins to change during an increase in clutch stroke and the clutch stroke (learning point 2+Δstrk) at which the MG1 rotation angle position begins to remain unchanged during a decrease in clutch stroke. A learning variation can be reduced since the average stroke is the engagement position. This control flow is terminated after the execution of Step S111.

With the vehicle control device 1-1 according to this embodiment, the engagement position of the clutch CL1 can be learned without rotating the first rotating machine MG1. Accordingly, the generation of a loss attributable to, for example, co-rotation of the first rotating machine MG1 can be inhibited. In addition, the engagement position of the clutch CL1 can be accurately learned.

The ECU 50 may learn the clutch stroke (learning point 1−Δstrk) at which the MG1 rotation angle position begins to change as the engagement position instead of learning the average stroke as the engagement position. In addition, the ECU 50 may learn the clutch stroke (learning point 2+Δstrk) at which the MG1 rotation angle position begins to remain unchanged as the engagement position.

First Modification Example of Embodiment

The clutch stroke at which the MG1 rotation angle position begins to change may be the learning point 1 or another clutch stroke. In other words, the clutch stroke at which the MG1 rotation angle position begins to change may be the clutch stroke immediately before the change in the MG1 rotation angle position or the clutch stroke immediately after the change in the MG1 rotation angle position available when the clutch stroke command value is gradually increased by stroke change amount Δstrk.

The clutch stroke at which the MG1 rotation angle position begins to remain unchanged may be the learning point 2 or may be another clutch stroke. In other words, the clutch stroke at which the MG1 rotation angle position begins to remain unchanged may be the clutch stroke available immediately before the MG1 rotation angle position begins to remain unchanged or the clutch stroke available immediately after the MG1 rotation angle position begins to remain unchanged when the clutch stroke command value is gradually decreased by stroke change amount Δstrk.

Second Modification Example of Embodiment

In the embodiment described above, the learning control regarding the engagement position of the clutch CL1 is executed during the traveling of the vehicle 100. However, the learning control can also be executed in another situation in which the clutch CL1 is subjected to a differential rotation. For example, the engagement position of the clutch CL1 can be learned in a situation in which the vehicle 100 is stopped and the engine 1 is in operation. In this case, the ECU 50 can learn the engagement position when the clutch stroke is gradually increased from a state where the vehicle 100 remains stopped, the engine 1 is in operation, the first rotating machine MG1 is stopped, and the clutch CL1 is released. As in the embodiment described above, the clutch stroke at which the MG1 rotation angle position begins to change may be learned as the engagement position of the clutch CL1.

In addition, the ECU 50 can learn the engagement position when the clutch stroke is gradually decreased from a state where the vehicle 100 remains stopped, the engine 1 is in operation, the first rotating machine MG1 is stopped, and the clutch CL1 is engaged. As in the embodiment described above, the clutch stroke at which the MG1 rotation angle position begins to remain unchanged may be learned as the engagement position of the clutch CL1.

Third Modification Example of Embodiment

In the embodiment described above, the ECU 50 detects the engagement position while gradually engaging the clutch CL1 before detecting the engagement position while gradually releasing the clutch CL1. However, the learning of the engagement position may also be performed in reverse order.

Fourth Modification Example of Embodiment

In the embodiment described above, the stroke change amount Δstrk is the minimum movement amount of the clutch CL1. However, the stroke change amount Δstrk is not limited thereto. The stroke change amount Δstrk may be a clutch stroke that exceeds the minimum movement amount or the stroke change amount Δstrk may correspond to several steps of the minimum movement amount. The stroke change amount Δstrk may be determined for the magnitude of the input torque of the first rotating machine MG1 not to become equal to or greater than maximum cogging torque (magnitude of the positive extreme value Tc1 and the negative extreme value Tc2) due to a change in clutch torque capacity during the change in clutch stroke by the stroke change amount Δstrk.

Fifth Modification Example of Embodiment

The vehicle 100, to which the invention is applied, is not limited to the example of the embodiment. For example, the vehicle control device 1-1 according to the embodiment can also be applied to a vehicle on which an engine, a rotating machine, and a clutch that connects and disconnects the rotating machine and a drive wheel from the engine are mounted. In this vehicle, the learning control regarding the engagement position of the clutch can be performed in a state where the vehicle remains stopped, the clutch is released, the rotating machine is stopped, and the engine is in operation. In addition, the learning control regarding the engagement position of the clutch can be performed in a state where the vehicle remains stopped, the engine is in operation, and the clutch is engaged so that the rotating machine is stopped by the cogging torque. For example, the engagement position of the clutch can be learned as in the second modification example.

Sixth Modification Example of Embodiment

In the embodiment described above, the change in the cogging torque is detected based on the detection result of the rotation angle position detecting device 5. However, the change in the cogging torque may also be detected by another method. In addition, the rotation angle position detecting device 5 is not limited to the resolver. The rotation angle position detecting device 5 is not particularly limited insofar as a change in the MG1 rotation angle position attributable to the change in the cogging torque can be detected therewith.

Seventh Modification Example of Embodiment

In the embodiment described above, the first rotating machine MG1 is connected to the first sun gear 11 and the clutch CL1 is connected to the first carrier 14. However, the invention is not limited thereto. For example, each of the first rotating machine MG1 and the clutch CL1 may be connected to a rotating element of the first planetary gear mechanism 10 other than these rotating elements according to the embodiment described above. In addition, the first rotating machine MG1 and the clutch CL1 may be connected without the differential mechanism such as the first planetary gear mechanism 10. In other words, the clutch CL1 may be arranged in any form insofar as the clutch CL1 can transmit the torque to the first rotating machine MG1 when engaged.

In addition, the engine 1, the first rotating machine MG1, and the second rotating machine MG2 may be connected to rotating elements of the first planetary gear mechanism 10 other than the rotating elements according to the embodiment described above.

The details that are disclosed in the embodiment and the modification examples described above can be appropriately combined with each other in execution.

REFERENCE SIGNS LIST

1-1 . . . VEHICLE CONTROL DEVICE, 1 . . . ENGINE, 3 . . . STATOR, 4 . . . ROTOR, 5 . . . ROTATION ANGLE POSITION DETECTING DEVICE, 32 . . . DRIVE WHEEL, 33, 34 . . . ROTATING SHAFT, 50 . . . ECU, CL1 . . . CLUTCH, MG1 . . . FIRST ROTATING MACHINE, MG2 . . . SECOND ROTATING MACHINE, ΔSTRK . . . STROKE CHANGE AMOUNT

The invention claimed is:

1. A control device for a vehicle, the vehicle including
   a first rotating machine, and
   a clutch configured to transmit torque to the first rotating machine when engaged, the control device comprising
   an electronic control unit configured to
   i) detect a change in cogging torque of the first rotating machine, and
   ii) learn an engagement position of the clutch based on a change in the cogging torque during a change in a clutch stroke of the clutch when the rotating machine is stationary.

2. The control device according to claim 1, wherein
   the vehicle includes a rotation angle position detecting device configured to detect a rotation angle position of the first rotating machine, and
   the electronic control unit is configured to detect the change in the cogging torque based on a detection result of the rotation angle position detecting device.

3. The control device according to claim 2,
   wherein the electronic control unit is configured to learn the clutch stroke at which the rotation angle position begins to change during an increase in the clutch stroke as the engagement position of the clutch.

4. The control device according to claim 2,
   wherein the electronic control unit is configured to learn the clutch stroke at which the rotation angle position begins to remain unchanged during a decrease in the clutch stroke as the engagement position of the clutch.

5. The control device according to claim 2,
   wherein the electronic control unit is configured to learn an average stroke of the clutch stroke at which the rotation angle position begins to change during an increase in the clutch stroke and the clutch stroke at which the rotation angle position begins to remain unchanged during a decrease in the clutch stroke as the engagement position of the clutch.

6. The control device according to claim 1, wherein the vehicle further includes
an engine,
a second rotating machine, and
a differential mechanism including a plurality of rotating elements in which the engine, the first rotating machine, and the second rotating machine are each connected to different rotating elements, and
the electronic control unit is configured to learn the engagement position of the clutch during traveling, during which the second rotating machine serves as a power source, or while a vehicle remains stopped with the engine being in operation.

7. The control device according to claim 1, wherein
the vehicle further includes an engine,
the clutch is configured to connect and disconnect a flow of power between the engine, and the first rotating machine and a drive wheel, and
the electronic control unit is configured to learn the engagement position of the clutch while a vehicle remains stopped with the engine being in operation.

* * * * *